Sept. 5, 1967　　　W. C. UPDEGRAVE　　　3,339,463
ROTARY FLUID MOTOR WITH AXIAL THRUST BALANCING MEANS
Filed Aug. 1, 1966　　　　　　　　　　　　　　3 Sheets-Sheet 1

INVENTOR
WALTER C. UPDEGRAVE
BY *Richard O. Church*
ATTORNEY

INVENTOR
WALTER C. UPDEGRAVE
BY Richard O. Church
ATTORNEY

Sept. 5, 1967  W. C. UPDEGRAVE  3,339,463
ROTARY FLUID MOTOR WITH AXIAL THRUST BALANCING MEANS
Filed Aug. 1, 1966  3 Sheets-Sheet 3

INVENTOR
WALTER C. UPDEGRAVE
BY *Richard O. Church*
ATTORNEY

United States Patent Office

3,339,463
Patented Sept. 5, 1967

3,339,463
ROTARY FLUID MOTOR WITH AXIAL THRUST BALANCING MEANS
Walter C. Updegrave, 300 Adams St., St. Lawrence, Reading, Pa. 19606
Filed Aug. 1, 1966, Ser. No. 569,390
3 Claims. (Cl. 92—31)

This application is a continuation-in-part of my copending application Ser. No. 352,905, filed Mar. 18, 1964, now abandoned.

This invention relates to fluid driven rotary motors, and, more particularly, to fluid motors of the reciprocating piston type wherein the piston is assembled in cooperative engagement with at least one helical spline and the mechanical output of the motor is delivered in the form of a rotational force.

Rotary motors of the type here described are of considerable utility in many fields of endeavor. For example, they are useful as power mechanisms to steer vehicles; to rotate control surfaces on aircraft wings; to operate ships' hatch covers; to slue various devices such as gun mounts, radar antennas, cranes and derricks. As examples of these latter devices, there may be mentioned service and maintenance trucks as employed by public utilities and similar companies, that are provided with a movable projecting arm pivoted on and supported by a mounting structure for raising and lowering movement about a horizontal axis and turning about a vertical axis. In this application, the arm is often used as a hoist for lifting equipment up and down and setting poles; it may carry a ground auger for drilling pole holes; or it may have an aerial platform to support a worker at elevated positions for servicing pole line equipment, overhead traffic and street lights, elevated illuminated signs and the like.

Rotary motors adapted for use in the above devices, in a simple and effective embodiment, comprise a piston that is keyed to a stationary member in a manner that permits the piston to move in a rectilinear reciprocating manner, but prevents the piston from rotating about its axis. An output member is provided that is journaled for rotation about its axis (and, accordingly, is restricted in axial movement) and is assembled in cooperative helical splined relationship with the piston. By this means, the rectilinear (axial) motion of the piston causes the output member to rotate and provide a torque which, in turn, may be utilized to drive associated mechanical devices in rotational motion.

The pistons of these motors are, for ease of construction, usually cylindrical and hollow in order that either the inside or outside surface of the piston may be keyed to the stationary member and the other surface engaged by means of a helical spline to the output member.

In more elaborate adaptations of these motors, both the stationary member and the output member carry helical splines and engage helical splines on both the inside and outside surfaces of the piston. Motors of this type are advantageous in that the action of the several helices can be compounded by making them of opposite hand, thus providing for a greater rotational displacement of the output member for a given linear displacement of the piston. By these means, the stroke of the piston may be reduced and an overall reduction in the size of the motor can be accomplished.

It has been recognized that multiple helical motors of this type are not often used due to the difficulty and high cost of their manufacture, particularly with respect to forming long internal helical splines on the interior of the piston and/or on the interior either of the stationary member or the output member. In order to compound the action of a plurality of helical splines and yet avoid this problem of machining long internal helical splines, devices such as shown in Patent 2,945,387 have been proposed, wherein the long helical splines are both of the external type. This is achieved by providing a pair of externally splined sleeves within the device in combination with a two-part piston assembly having relatively short internally helically splined skirt portions that mate with the long splines of the sleeves. While devices of this type present a partial solution to the problem, this design and construction is still unduly complex and leaves much to be desired.

Accordingly, it is an object of this invention to provide an improved fluid actuated motor of the helical splined type that is efficient in operation, comparatively simple to construct, and that has a comparatively large rotational displacement for a given axial displacement of the piston.

Another object of this invention is to provide a compact design for a fluid actuated motor of the helical splined type that does not materially sacrifice the power output or total rotational displacement of the motor.

It is a further object of this invention to provide a fluid motor of the helical splined type that is rugged, dependable, and yet smooth in operation.

A further object of this invention is to provide a torque producing motor that carries a hollow, axially disposed mid portion for access to, and as a conduit for, various control and auxiliary equipment.

Yet another object of this invention is to provide a fluid actuated motor of the compound helical splined type in which the internal helical splines are comparatively short in length.

And yet another object of this invention is to provide means for accommodating axial components of force developed in the operation of a fluid actuated motor of the helical spline type and so reduce the forces that must be carried by the thrust bearings.

Briefly, these and other objects of this invention are achieved by providing three functionally related, circumferentially spaced and axially aligned cylinders in which long helical splines are carried on the outside diameter of the inner and medial cylinders and only comparatively short internal helical splines are carried on the inside diameter of the medial and outer cylinders. The inner and outer cylinders are journaled for rotation with reference to each other and are cooperatively engaged by oil sealing means located adjacent their axial end portions whereby a fluid-tight chamber is defined. The medial cylinder is located entirely within this fluid-tight chamber and is secured to a piston adjacent one of its ends. The piston, in turn, is engaged in sliding but pressure sealing relationship on its inner diameter to the outside diameter of the inner cylinder and on its outside diameter to the inner diameter of the outer cylinder. By selecting the radial distance from the common axis of the inner and outer cylinders at which the oil seal between the inner and outer cylinder is positioned, the axial thrust forces that are developed when high pressure working fluids are introduced into the fluid-tight chamber can, at least in part, be balanced, thus relieving much of the thrust that otherwise would have to be carried by the end bearings.

Figure 1:
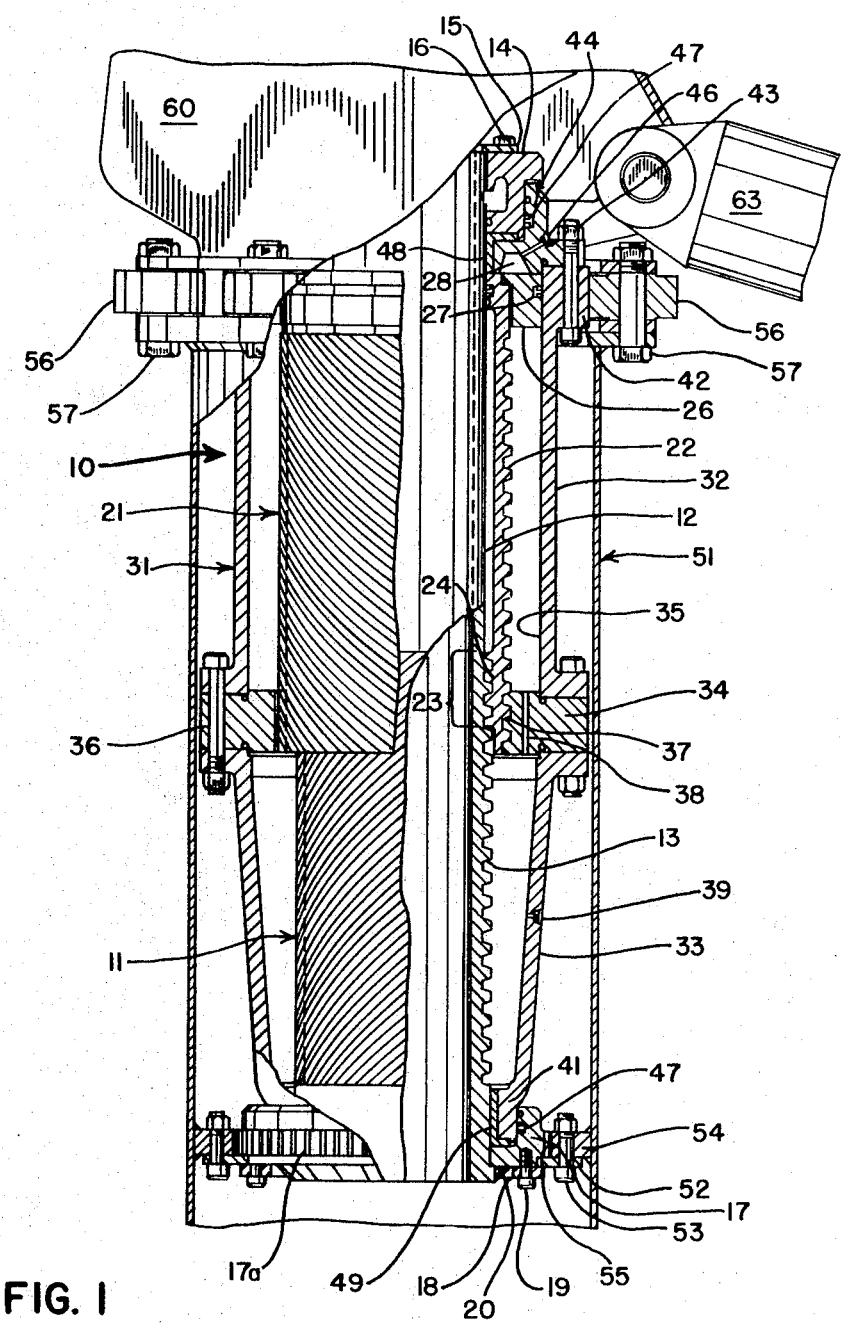
FIG. 1 is a view, partially in section, of a fluid motor constructed in accordance with this invention.

The details of a fluid motor constructed in accordance with this invention are illustrated in FIG. 1. For convenience in describing and understanding this drawing, the motor may be viewed as being comprised of three principal and functionally related members. These are the inner cylinder 11, the medial cylinder 21, and the outer cylinder 31. All of these members are hollow, generally cylindrical, rigid, torque-transmitting elements that are axially aligned and circumferentially spaced with respect to each other. A full description of these parts is contained in the following paragraphs.

*Inner cylinder*

The inner cylinder 11 extends substantially the axial length of the fluid motor and carries external helical splines 13 on its lower portion. The outside diameter of its upper portion 12 has a smooth surface, preferably a machined finish, suitable for coacting with oil rings 27 in fluid sealing relationship. While not essential to the operation of the motor, inner cylinder 11 may usefully be hollow in order that control devices and associated equipment can pass through or be positioned within the motor.

The inner cylinder 11 is secured at its upper end by means of a tapped and threaded locking ring 14 that is screwed onto the top of the cylinder. A locking plate 15 is provided and secured by bolts 16 to prevent rotation of the locking ring 14 with respect to the cylinder 11 once it has been positioned.

The inner cylinder 11 is supported at its lower end by a ring plate 52 that is secured by means of bolts 53 onto flange 54. Flange 54, in turn, is welded to the support structure 51. Relative rotational movement between inner cylinder 11 and support structure 51 is prevented by means of the external splined teeth 17a carried on the periphery of lower end gland 17 that engage internal splined grooves 55 in flange 54. The lower end gland 17 is cup-shaped and is pressed onto the lower end of cylinder 11 where it is secured as by a weld 20.

Finally, the inner member 11 is secured from relative upward movement by means of end plate 18 that is secured by bolts 19 to the underside of ring plate 52.

*Medial cylinder*

The medial cylinder 21 extends about half the axial length of the fluid motor and carries exterior helical splines 22 over substantially its entire outside diameter. In addition, a skirt portion 23 is provided on the inside diameter of the medial cylinder 21 that carries internal helical splines 24. Note that the internal splines extend only a relatively short distance into the medial cylinder 21. Secured (for convenience, by screw threads) to the upper portion of medial cylinder 21 is an annular member 26 which, in cooperation with the top of the medial cylinder 21 and oil rings 27, provide a piston that is engaged in fluid sealing relationship on its inside diameter with the machined surface 12 of the inner cylinder 11, and on its outside diameter with the inside diameter of the upper portion of the outer cylinder 31 (described in detail below).

*Outer cylinder*

While it is of no particular functional importance, it is convenient in the construction of the outer cylinder to fabricate it from three separate parts. As shown in FIG. 1, these parts comprise an upper portion 32, a central portion 34, and a lower portion 33. A flange on the lower part of upper member 32 and a flange on the upper portion of lower member 33 are abutted against central portion 34 and are there fixedly positioned by means of bolts 36. The upper member is generally cylindrical in shape and has smooth interior walls 35, preferably machined surfaces, in order that the piston 26 can engage this surface in fluid sealing relationship.

The lower portion 33 of the outer cylinder may deviate from a cylindrical configuration, and is here illustrated as having sloping side walls in the form of an inverted, truncated cone.

The central portion 34 of the outer cylinder 31 is an annulus of relatively short axial extent as compared with the length of the outer cylinder 31, and is provided with internal helical splines 37.

A shoulder portion 41 is provided at the bottom end of the lower portion 33 of outer cylinder 31. This shoulder portion 41 is journaled for rotation about the axis of the fluid motor and is supported both axially and radially by bushing 49. The upper portion 32 of the outer cylinder 31 similarly is provided with a shoulder portion or flange 42 adjacent its upper end. This flange 42 provides means for securing end member 44 to the outer cylinder 31 by means of bolts 43. The end member 44, in turn, radially and axially supports inner cylinder 11 in bushing 48. By these conjoint means, outer cylinder 31 is journaled for rotation about inner cylinder 11 at each of its ends.

In connection with the end member 44 of the outer cylinder 31, there is provided a fluid connection 46 for attaching a high pressure fluid line (not shown) to communicate with annular space 28 located above the top of the piston 26. High pressure fluids may also be introduced on the under side of piston 26 via fluid connection 39 and drilled passageway 38 in central portion 34.

Fluid seals 47 are provided at the opposite ends of the motor in order that the working fluid may be contained within the annular spaces defined by the interior walls of outer cylinder 31 and the outer walls of inner cylinder 11. In the preferred embodiment of this invention, axial grooves are provided in bushings 48 and 49 to permit the working fluid to pass freely therethrough up to the oil seals 47. By these means, the working fluid may be utilized to provide lubrication for the bushings 48 and 49.

*Support structure*

The entire motor is contained within the support structure 51 that in turn can be rigidly affixed to the framework of any associated equipment. As mentioned above, the lower portion of structure 51 carries a flange 54 drilled to receive bolts 53. A ring plate 52 is bolted by means of bolts 53 to flange 54 to provide a shoulder upon which the fluid motor may rest. The fluid motor may be inserted through the upper end of the support structure 51 and rotated until the external splined teeth 17a carried by end bland 17 of the inner cylinder 11 engage the internal splines 55 of flange 54. After these splines are engaged, the motor will rest against ring plate 52, at which time end plate 18 is bolted into place by means of bolts 19, which prevents the motor from being displaced in an upward axial direction.

A series of cam roller bearings 56, positioned for rotation about their axes by bolts 57, is circumferentially spaced adjacent the upper end of housing 51. These bearings provide horizontal support for the upper shoulder portion 42 of the outer cylinder 31 and will accommodate any moments of force that tend to upset the axis of the fluid motor.

Figure 2:
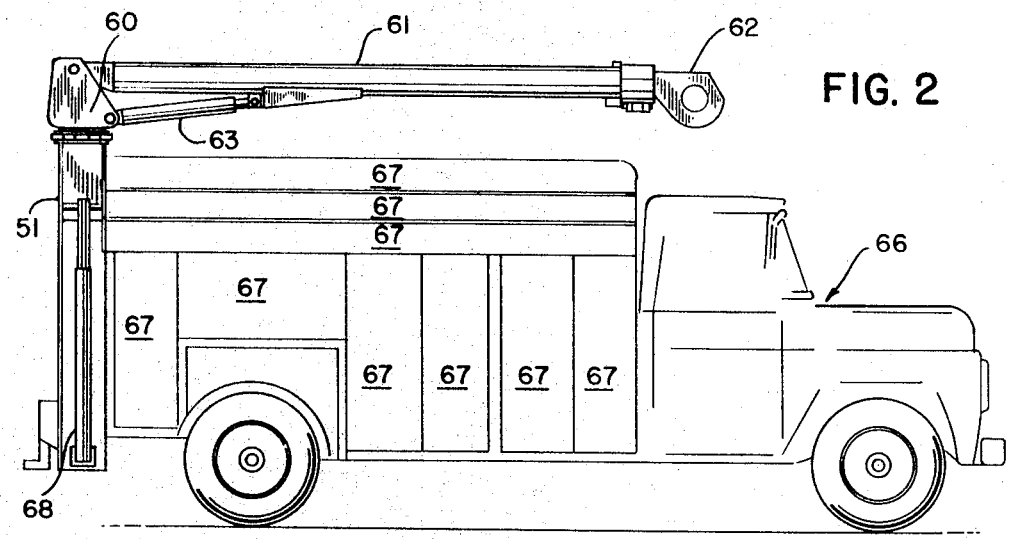
FIG. 2 is a side elevation of a utility truck carrying a rotating boom incorporating the fluid motor of this invention.

In FIG. 2, the fluid motor of this invention is shown associated with a boom structure mounted on a utility truck. The utility truck 66 is shown with a series of storage compartments 67 positioned along its sides and the boom structure mounted adjacent its rear corner. It is apparent that the boom structure can be mounted at any convenient location on the truck, depending on the type of body and location of the storage compartments.

Figure 3:
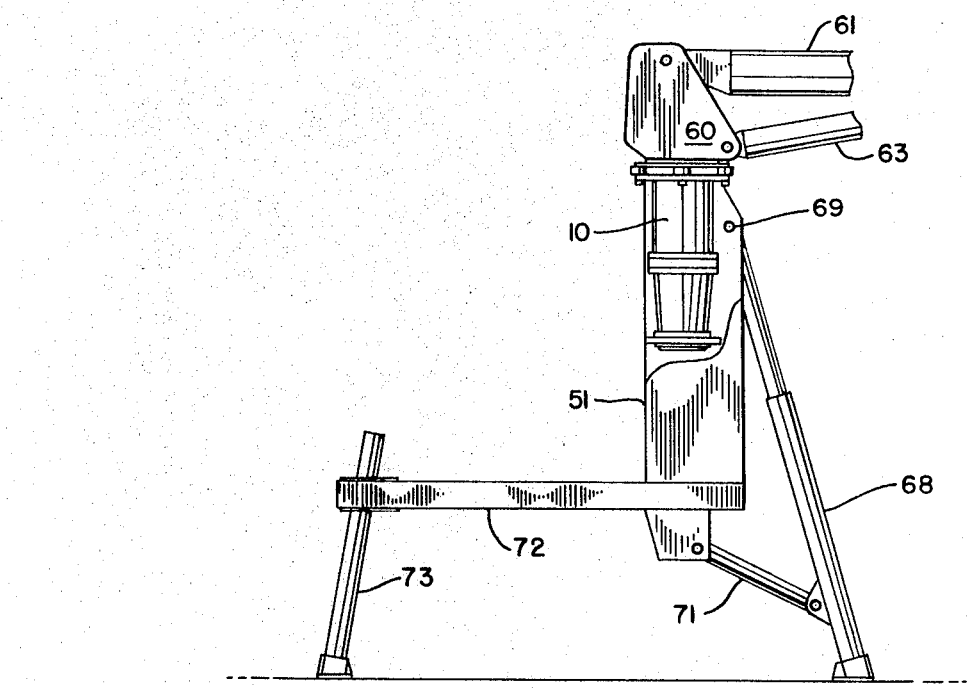
FIG. 3 is a front elevation, partially broken away, showing the device of this invention carried in suitable support and mounting means.

As best illustrated in FIG. 3, the boom mechanism is supported on a bed plate 72 of truck 66 by means of support housing 51. An outrigger brace 68 is pivoted as at 69 and locked as by member 71 to prevent tipping of the bed plate and truck body when the boom 61 is extended to the side of the truck. If desired, an additional outrigger brace 73 may be provided on the opposite side of the bed plate of the truck. The foot of boom 61 is affixed to a boom support 60 and is pivoted therein for rotational motion about a horizontal axis. This rotation enables moving the boom up and down, and it may conveniently be controlled in these movements by a hydraulic cylinder such as shown at 63. The head 62 of the boom 61 is provided with a suitable fixture for attaching any desired equipment such as pole handling equipment, augers, or aerial platforms.

The boom support 60 is integral with end member 44 and is secured to motor 10 by bolts 43. This enables rotation of the boom support 60 and, accordingly, the boom 61, about a vertical axis when actuated by the fluid motor.

Operation of the motor

Rotation of the fluid motor is effected by axial displacement of the medial cylinder 21. With reference to the relative position of the parts as shown in FIG. 1, axial displacement of the medial cylinder 21 in a downwardly direction will cause a reaction between the inner helical splines 24 of skirt portion 23 and the external helical splines 13 of inner cylinder 11. As inner cylinder 11 is fixedly attached to support housing 51 and cannot rotate in relationship thereto, rotational motion is imparted to the medial cylinder 21 as it moves in an axial direction.

Similarly, the external helical splines 22 of medial cylinder 21 react with the internal splines 37 of the outer cylinder 31 as the medial cylinder 21 is moved downwardly. Since the external helical splines 22 of the medial cylinder 21 are of an opposite hand to the helical splines 13 of inner cylinder 11, the reaction of the splines is compounded and causes a comparatively large angular displacement of the outer cylinder 31 with a given axial displacement of the medial cylinder 21.

As previously mentioned, the outer cylinder 31 is fixedly attached by bolts 43 to the boom support 60 so that the boom 61 will rotate with the outer cylinder 31. Rotation in the opposite direction can, of course, be readily obtained by moving the medial cylinder 21 in an upwardly rather than a downwardly direction. (It should be mentioned that throughout this description of the drawings, the terms "upwardly" and "downwardly," "top" and "bottom" and the like, are used for clarity when referring to the motor as shown in FIG. 1. However, it should be understood that these terms are non-limiting, as the motor may be mounted about any desired axis.)

Axial motion of the medial cylinder 21 is induced by high pressure working fluids that may be introduced or bled from regions above and below the piston 26, as at 46 and 39 respectively. While the nature of the working fluid is not critical to this invention, hydraulic oils are generally preferred. In the instance of a rotating boom mechanism such as shown in FIG. 2, operating pressures in the range of about 2,000 p.s.i. are suitable.

It can be seen from the drawing of FIG. 1 that the operating fluid fills the entire cavity between the inner and outer cylinders. Oil ports 38 are provided to insure communication of the fluid between the upper and lower portions of this cavity.

As has previously been mentioned, it is desirable to balance the axial thrust forces as much as possible to avoid the need for large thrust bearings. Reference has been made to the fact that the forces may be balanced by proper positioning of the oil seals between the stationary inner cylinder and the rotating outer cylinder. For a more complete understanding of the importance of properly positioning the oil seals, reference is made to FIGS. 4–8. These figures illustrate the forces that are developed at the upper portion of the motor when the piston is driven downward. It will be understood that these comments will apply equally to the lower portion of the motor when the piston is driven in an upward direction.

Figure 4:
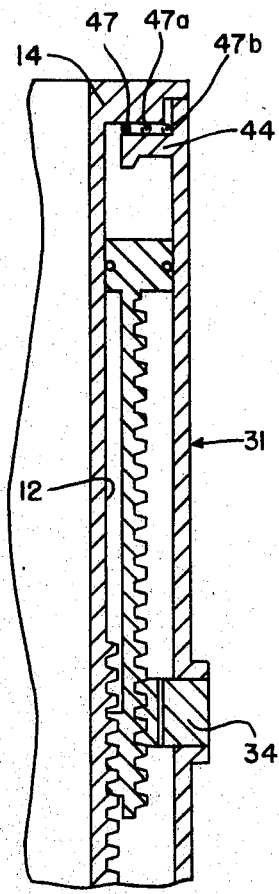
FIG. 4 is a simplified schematic view of an upper right hand portion of FIG. 1 showing the inner, medial and outer cylinders.
Figures 5, 6, 7:
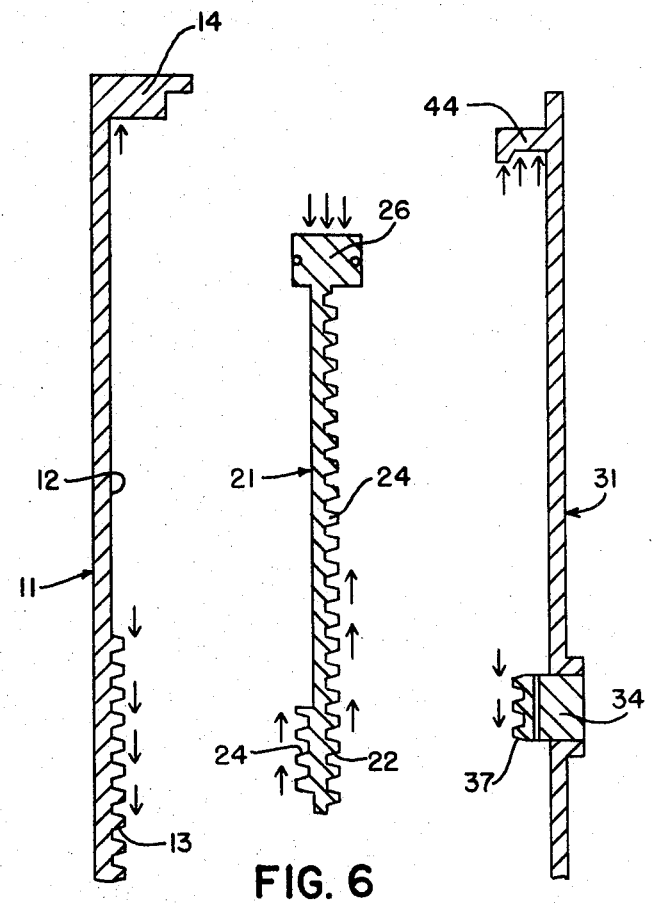
FIGS. 5, 6 and 7 are schematic drawings illustrating the forces developed upon the inner cylinder, the medial cylinder and the outer cylinder respectively during operation of the device of this invention.

With specific reference to FIGS. 4–7, there is schematically illustrated the upper right hand portion of the motor when fluid under pressure is introduced above the piston 26 in order to drive the piston and the medial cylinder 21 downward. When the hydraulic fluid is introduced into chamber 28, it will, of course, exert a force in all directions, including an upward force on locking ring 14 of the inner cylinder 11, a downward force on piston 26, and an upward force upon end member 44 of the outer cylinder 31. It can be seen that when the medial cylinder 21 is driven downward, the splines 24 of the medial cylinder will react with the splines 13 of the inner cylinder to develop forces as shown in FIGS. 5 and 6. This will result in the medial cylinder being placed under compression and the inner cylinder being placed in tension. Similarly, as shown in FIG. 7, the outer cylinder 31 will be placed in tension due to the upward pressure forces on the under side of end member 44 and the downward force against splines 37. If the net axial forces acting upon inner cylinder 11 are zero and if the next axial forces acting upon outer cylinder 31 are zero, there will be no unbalanced axial forces that need be accommodated and, accordingly, the thrust bearings may be of nominal size.

The downward forces that will be developed upon splines 13 and 37 are approximately a function of the helix angle of the splines, the pitch diameter of the splines, the operating pressure, the area of the piston, and the friction developed at the splines. These forces are, in turn, balanced by the upward forces on members 14 and 44 which are a function of the hydraulic pressure within the chamber 28 and the effective area of members 14 and 44 upon which it acts. The effective areas of end members 14 and 44 refers to the areas of end members that are acted upon by the pressure within the chamber 28 to produce a net axial force. It must be noted that this effective area is not determined by the area of the end member physically located within the chamber 28, but rather is determined by the radial position of oil seal 47. For example, with reference to FIG. 4, if the oil seal is located as at 47, the effective area of end member 14 will be determined by the annulus between the seal 47 and the surface 12 of the inner cylinder 11. Further, while the oil seal is in this position, the entire under surface of the end member 44 of the outer cylinder 31 will be acted upon by the oil pressure. The condition that exists when the oil seal is at 47 (FIGURE 4) is schematically illustrated by the single upturned arrow at FIGURE 5, and the three upturned arrows in FIGURE 7. As the oil seal 47 is moved to the right, first to position 47a and then to position 47b, the effective area of end member 14 will be increased while the effective area of end member 44 will be decreased. When the oil seal is located at 47b, the effective area of end member 44 will be essentially zero since both the top and bottom positions of the end member 44 will be subjected to the same pressures.

In order to determine the radial location of the seal 47, the factors mentioned in the paragraph above must be taken into account. As a simplified illustration, the frictional forces may be neglected and the helix angle of all of the splines defined as being equal. In this instance, the only difference between the forces acting upon the inner and outer cylinders will be due to the differences in pitch diameter. However, since the total downward force of the medial cylinder must be equally received by the inner and outer cylinders, it can be appreciated that a lesser pitch diameter of the helices of the inner cylinder will require a larger effective balancing area of element 14 than will be required of element 44 of outer cylinder 31.

Figure 8:
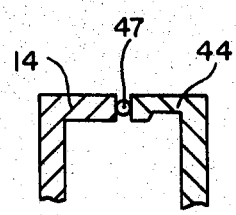
FIG. 8 is a schematic drawing showing another means for locating an oil seal between the end members of the inner and outer cylinders.

In addition to the positioning of the upper members of the inner and outer cylinders as shown in FIGS. 4–7, they may be directly abutted as shown in FIG. 8 with the oil seal intermediate to the end members. It can easily be seen that by adjusting the annular area of these members, any desired balancing force may be obtained, as described above. Generally, however, a construction such as shown in FIG. 4 is preferable since by positioning oil seals 47 hydraulically downstream or outboard of the bushings 48 and 49, the hydraulic fluid will additionally serve to lubricate the bushings.

In the above description of the drawings, the fluid motor has been described with a stationary inner cylinder and a rotating outer cylinder. As it is a simple expedient to reverse this arrangement so that the outer cylinder is held stationary while the inner cylinder rotates, it is to be understood that such alternative arrangement is included within the scope of this invention.

I claim:
1. A fluid motor comprising:
 (I) an inner, a medial, and an outer generally cylindrical, hollow, rigid members, axially aligned and circumferentially spaced with respect to each other;
  (A) said inner member extending substantially the axial length of said motor and comprising:
   (1) a first portion having a smooth outside diameter; and
   (2) a second portion carrying external helical splines of a given hand;
  (B) said medial member comprising an annularly shaped fluid-driven piston extending only a portion of the axial length of said motor and comprising:
   (1) a piston head located adjacent one end of said medial member;
   (2) an interior skirt portion located adjacent the other end of said medial member having internal helical splines that are adapted to engage the helical splines of the second portion of said inner member in mechanically cooperative relationship; and
   (3) an outer portion carrying external helical splines of opposite hand to the given hand of the helical splines of said inner member; and
  (C) said outer member extending substantially the axial length of said motor and comprising:
   (1) a first portion having a smooth inside diameter concentrically positioned with respect to said first portion of said inner member;
   (2) a central portion adjacent said first portion of comparatively small axial extent carrying internal helical splines adapted to engage the external helical splines of said medial member in mechanically cooperative relationship; and
   (3) a third portion adjacent the other side of said central portion concentrically positioned with respect to said second portion of said inner member;
 (II) first fluid sealing means engaging the outside diameter of said first portion of said inner member with the inside diameter of said piston head;
 (III) second fluid sealing means engaging the inside diameter of said first portion of outer member with the outside diameter of said piston head;
 (IV) port means adapted to permit the introduction and removal of fluids under pressure from either side of said piston head; and
 (V) end flanges on each of the ends of both said inner and said outer members, including first and second bearing means adapted to enable rotational movement of one of said members relative to the other of said members;
  (A) said first bearing means comprising a generally cylindrical bearing surface adapted to accommodate radial forces during rotation of one of said members relative to the other of said members;
  (B) said second bearing means comprising a generally radially extending bearing surface adapted to accommodate axial forces during rotation of one of said members relative to the other of said members; and
 (VI) third fluid sealing means annularly disposed at a fixed radial distance from the common axis of the inner and outer cylinders intermediate the outer diameter of the inner cylinder and the inner diameter of the outer cylinder, which fixed distance is selected to provide axial internal fluid pressure forces on said end flanges that will balance, to a substantial degree, the axial forces developed on the splines of said inner member with the axial forces developed on the splines of said outer member when said fluid motor is subjected to internal fluid pressure.

2. A motor according to claim 1 in which said bearing means are adapted to permit the passage of fluids under pressure therethrough.

3. A motor according to claim 2 in which said bearing means are positioned, from a hydraulic viewpoint, downstream from said third fluid sealing means.

References Cited
UNITED STATES PATENTS

| 2,835,205 | 5/1958 | Erdman | 103—112 X |
| 2,932,206 | 4/1960 | Tootle | 92—108 X |
| 2,970,574 | 2/1961 | Geyer | 92—33 |
| 3,090,244 | 5/1963 | Davis | 92—31 X |
| 3,187,592 | 6/1965 | Geyer | 92—33 X |

MARTIN P. SCHWADRON, *Primary Examiner.*

I. C. COHEN, *Assistant Examiner.*